(12) United States Patent
Kherroubi et al.

(10) Patent No.: US 10,013,748 B2
(45) Date of Patent: Jul. 3, 2018

(54) DOWNHOLE IMAGING TECHNIQUES USING LAMINATION ANALYSIS

(71) Applicant: Schlumberger Technology Corporation, Sugar Land, TX (US)

(72) Inventors: Josselin Kherroubi, Clamart (FR); Carlos Maeso, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 31 days.

(21) Appl. No.: 15/239,180

(22) Filed: Aug. 17, 2016

(65) Prior Publication Data
US 2017/0053389 A1 Feb. 23, 2017

(30) Foreign Application Priority Data
Aug. 21, 2015 (EP) .................................... 15290213

(51) Int. Cl.
*G06K 9/36* (2006.01)
*G06T 5/10* (2006.01)
*E21B 47/00* (2012.01)

(52) U.S. Cl.
CPC ............ *G06T 5/10* (2013.01); *E21B 47/0002* (2013.01); *G06T 2207/10004* (2013.01)

(58) Field of Classification Search
None
See application file for complete search history.

(56) References Cited

U.S. PATENT DOCUMENTS

| | | | |
|---|---|---|---|
| 4,357,660 A | 11/1982 | Hepp | |
| 4,939,649 A | 7/1990 | Duffy | |
| 5,299,128 A | 3/1994 | Antoine et al. | |
| 5,311,951 A * | 5/1994 | Kyte | E21B 47/022 175/40 |
| 5,809,163 A | 9/1998 | Delhomme et al. | |
| 5,960,371 A | 9/1999 | Saito et al. | |
| 5,983,163 A | 11/1999 | Waid et al. | |
| 7,236,887 B2 | 6/2007 | Wang et al. | |
| 9,182,517 B1 * | 11/2015 | Selman | G01V 5/04 |
| 2008/0239871 A1 * | 10/2008 | Thevoux-Chabuel | E21B 47/022 367/27 |

(Continued)

FOREIGN PATENT DOCUMENTS

EP 0379432 A1 7/1990

*Primary Examiner* — Andrae S Allison
(74) *Attorney, Agent, or Firm* — Michael Dae (57) ABSTRACT

Embodiments of the disclosure involve a method comprising computing a true stratigraphic thickness ("TST") index based on one or more dynamic images, one or more measurement images, or combinations thereof. Computing the TST index comprises outputting a dynamic image value channel comprising a median value on each depth of the one or more dynamic images, a dynamic normalized image value channel comprising a normalization of the dynamic image value channel, a measurement image value channel comprising a median value on each depth of the measurement image, and the TST index. The method also involves computing a decomposition channel based on the TST, extracting lamination boundaries from the dynamic image value channel based on the decomposition channel, and computing the lamination properties based on the lamination boundaries.

18 Claims, 4 Drawing Sheets

(56) References Cited

U.S. PATENT DOCUMENTS

| | | | |
|---|---|---|---|
| 2010/0307742 A1* | 12/2010 | Phillips | E21B 47/022 166/250.01 |
| 2011/0282634 A1* | 11/2011 | Marza | G06T 17/05 703/2 |
| 2012/0191354 A1* | 7/2012 | Caycedo | E21B 47/022 702/9 |
| 2014/0000964 A1* | 1/2014 | Selman | E21B 44/00 175/24 |
| 2015/0240616 A1* | 8/2015 | Woodward | G05B 15/02 700/275 |

* cited by examiner

True stratigraphic thickness. True stratigraphic thickness is the thickness of a rock layer measured perpendicular to the layer, with corrections for bed dip and deviation of the wellbore that penetrates the layer.

DOWNHOLE IMAGING TECHNIQUES USING LAMINATION ANALYSIS

CROSS-REFERENCE TO RELATED APPLICATIONS

The present application claims priority to EP Application Serial No. 15290213.6, which was filed on 21 Aug. 2015, and is incorporated herein by reference in its entirety.

BACKGROUND

The present disclosure relates to a method for estimating at least one logging tool response in a formation, as well as systems and methods for interpreting at least one formation property of a formation surrounding a borehole.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

Borehole images may be utilized to evaluate structural or sedimentary dip of layers and laminations crossed by the borehole and to identify laminations in the vicinity of the borehole. For example, borehole images may be interpreted in terms of dips to delineate the geometry of layers forming the reservoirs and their cap-rocks. Such formation geometries, including planar surfaces or dips, such as bedding or lamination, may be observable in borehole images as sinusoidal traces. As such, borehole images may provide relatively accurate lamination geometry with high resolution. Currently manual or semi-automatic dip picking methods are used for estimating the orientation of the bedding or laminations and for a coarse estimation of the lamination density.

Geologists classically study the laminations for sequence stratigraphy and sedimentary analysis. Recent work has also been conducted based on the geomechanical influence of the laminations on the completion phase, especially in unconventional resource environments. Reservoir software has begun to include lamination information such as lamination density or spacing through modeling to predict borehole behavior, e.g., predicting fracturing propagation.

SUMMARY

Embodiments of the disclosure involve a method for characterizing laminations. The method involves inputting dips, which may be manually created or obtained through semi-automatic dip picking, and computes statistics and density of the lamination environment. The computed lamination environment data may be corrected for borehole deviation, such that they may be analyzed and compared regardless of borehole deviation. As such, sequence recognition may be performed in single wells or multiple wells. The present embodiments also involve identifying and studying different scales of laminations and bedding, which may provide additional information for further interpretation. Embodiments may also include extracting information from particular lamination types based on their image properties. Embodiments may further involve a lamination sequence recognition method, which may input such quantitative information and may be used for well-to-well correlation, horizontal well correlation analysis, or geological trend analysis.

Embodiments of the disclosure involve a method comprising computing a true stratigraphic thickness ("TST") index based on one or more dynamic images, one or more measurement images, or combinations thereof. Computing the TST index comprises outputting a dynamic image value channel comprising a median value on each depth of the one or more dynamic images, a dynamic normalized image value channel comprising a normalization of the dynamic image value channel, a measurement image value channel comprising a median value on each depth of the measurement image, and the TST index. The method also involves computing a decomposition channel based on the TST, extracting lamination boundaries from the dynamic image value channel based on the decomposition channel, and computing the lamination properties based on the lamination boundaries.

One or more embodiments involve a system comprising a downhole imaging tool configured to output formation properties and an image processing system comprising a processor suitable for executing machine readable instructions to characterize a lamination zone and to compute a correlation curve based on the characterization.

In accordance with the present disclosure, combinations of any of these features are considered.

DETAILED DESCRIPTION

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

While lamination analysis is important for providing accurate lamination geometry and for sequencing stratigraphy and sedimentary analysis, as well as for modelling and predictions of borehole behavior, such analysis has been generally based on qualitative judgment provided by geologists. Quantitative lamination analysis techniques have been insufficient for the processing and extraction of lamination information from borehole images.

The present techniques involve a workflow for quantitative lamination analysis. The techniques involve inputting image array and input dips (with dip orientation trend along the well) into a workflow, and outputting lamination layer densities and statistics. The outputs may then be computed for different scales of lamination and in some embodiments, particular types of laminations. Additionally, some embodiments involve using statistical learning to develop a lamination sequence recognition module.

Figure 1:
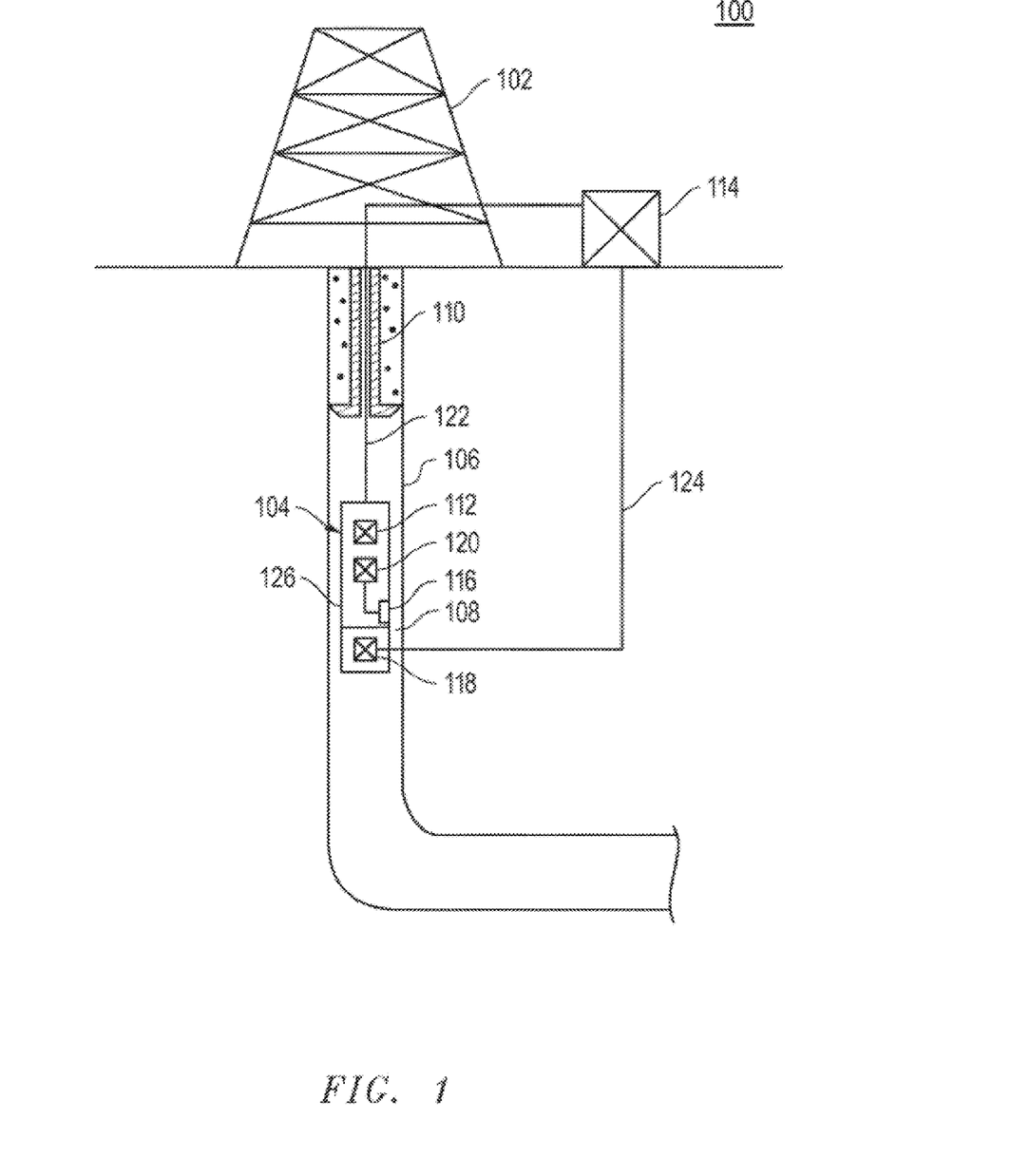
FIG. 1 is a schematic view of a system for determining downhole parameters comprising a downhole tool positioned in a wellbore in accordance with embodiments of this disclosure.

FIG. 1 is a schematic view of a wellsite 100 having an oil rig 102 with a downhole tool 104 suspended into a wellbore 106 therebelow. A drilling mud, and/or a wellbore fluid 108, may have been pumped into the wellbore 106 and may line a wall thereof. As shown, a casing 110 has also been positioned in the wellbore 106 and cemented into place therein. The downhole tool 104 may include one or more sensors for determining one or more downhole parameters, such as wellbore fluid parameters and/or formation parameters. The wellbore fluid parameters, or properties, may be determined by the one or more sensors independent of a determination of the formation parameters.

The downhole tool 104 is shown as a wireline logging tool lowered into the wellbore 106 to take various measurements. The downhole tool 104 may include a conventional logging device 112, a sensor 116, one or more telemetry devices 118, and an electronics package 120. The conventional logging device 112 may be provided with various sensors, measurement devices, communication devices, sampling devices and/or other devices for performing wellbore operations. For example, as the downhole tool 104 is lowered, it may use devices, such as resistivity or other logging devices, to measure formation parameters and/or properties.

As shown, the downhole tool 104 may be conveyed into the wellbore 106 on a wireline 122. Although the downhole tool 104 is shown as being conveyed into the wellbore 106 on a wireline 122, it should be appreciated that the downhole tool 104 may be a wireline tool, a measurement-while-drilling tool, a logging-while-drilling tool, or any suitable tool, conveyed through any suitable conveyance, such as a slick line, a coiled tubing, a drill string, a casing string and the like. The downhole tool 104 may be operatively connected to a surface unit 114 for communication therebetween. The downhole tool 104 may be wired via the wireline 122, as shown, and/or wirelessly linked via the one or more telemetry devices 118. The one or more telemetry devices 118 may include any telemetry devices, such as electromagnetic devices, for passing signals to a surface unit 114 as indicated by communication links 124. Further, it should be appreciated that any communication device or system may be used to communicate between the downhole tool 104 and the surface unit 114. Signals may be passed between the downhole tool 104 and the surface unit 114 and/or other locations for communication therebetween.

While the downhole tool 104 is depicted as the wireline tool 104 having the sensor 116 thereon, it will be appreciated that the sensor 116 may be positioned downhole on a variety of one or more tools. For example, the sensor 116 may be placed downhole on a drillstring, coiled tubing, drill stem tester, production, casing, pipe, or other downhole tool. Although only one sensor 116 is shown, it should be appreciated that one or more sensors 116 and/or portions of the sensors 116 may be located at several locations in the wellbore 106. The sensor 116 is preferably positioned about an outer surface of the downhole tool 104 so that the downhole fluid may pass therealong for measurement thereof. However, it will be appreciated that the one or more sensors 116 may be positioned at various locations about the wellsite 100 as desired for performing fluid measurement.

The electronics package 120 may include any components and/or devices suitable for operating, monitoring, powering, calculating, calibrating, and analyzing components of the downhole tool 104. Thus, the electronics package 120 may include a power source, a processor, a storage device, a signal conversion (digitizer, mixer, amplifier, etc.), a signal switching device (switch, multiplexer, etc.), a receiver device and/or a transmission device, and the like. The electronics package 120 may be operatively coupled to the sensor 116. The power source in the electronics package 120 may apply a voltage to the sensor 116. The power source may be provided by a battery power supply or other conventional means of providing power. In some cases, the power source may be an existing power source used in the downhole tool 104. The power source may be positioned, for example, in the downhole tool 104 and wired to the sensor 116 for providing power thereto as shown. Optionally, the power source may be provided for use with the sensor 116 and/or other downhole devices. Although the electronics package 120 is shown as one separate unit from the sensor 116, it should be appreciated that any portion of the electronics package 120 may be included within the sensor 116. Further, the components of the electronics package 120 may be located at various locations about the downhole tool 104, the surface unit 114 and/or the wellsite 100. The sensor 116 may also be wired or wirelessly connected to any of the features of the downhole tool 104, and/or surface unit 114, such as communication links, processors, power sources or other features thereof.

The sensor 116 may be capable of determining one or more downhole fluid parameters and/or one or more formation parameters. The downhole fluids may include any downhole fluids such as downhole mud (e.g., oil based), hydrocarbons, water and/or other downhole fluids. The sensor 116 may determine the downhole parameters of the downhole fluids and/or the downhole formations as the downhole tool 104 passes through the wellbore 106. Due to the harsh conditions of the downhole environment, the sensor 116 may be positioned on the downhole tool 104 in such a manner that the sensor 116 is capable of measuring fluids as the downhole tool 104 passes through the wellbore 106. Further, the sensor 116 may be positioned in such a manner that reduces clogging of downhole fluids as the downhole fluids pass the sensor 116. As shown, the sensor 116 is positioned on an outer surface 126 of the downhole tool 104. The sensor 116 may also be positioned at various angles and locations.

Formation properties measured by the downhole tool 104 may be processed into a borehole image. For example, portions of such processing may occur at the downhole tool 104, the surface unit 114, or at any other suitable processor. The borehole image may be received from a downhole tool 104 having any type of conveyance, and having any type of sensor geometry or arrangement, including both pad-based and rotating sensors, and input dips. For example, borehole images from the MicroScopeHD and the FMI Fullbore Formation Microimager, both marks of Schlumberger. The dips of the borehole image may have been picked using a semi-automatic dip picking process. Embodiments of the present techniques may utilize such borehole images, as well as other images (e.g., core images) or other types of suitable data (e.g., high resolution 1D data).

Figure 2:
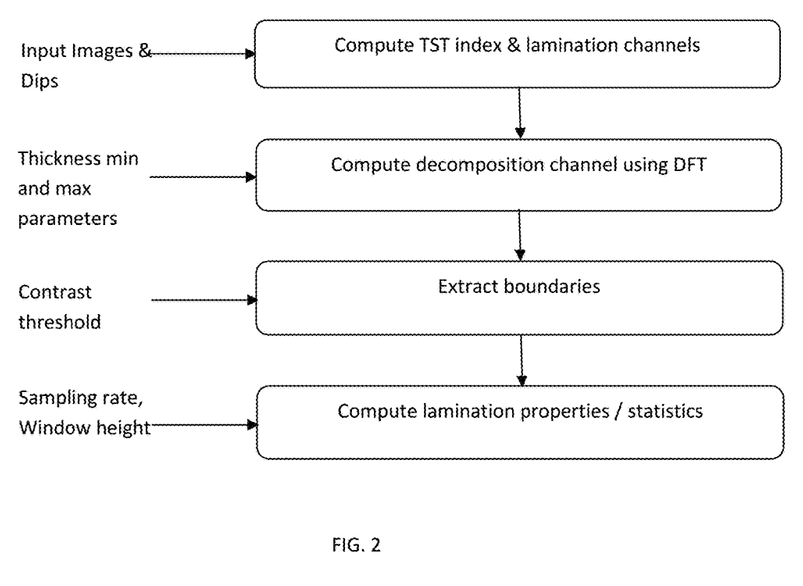
FIG. 2 is a workflow for lamination characterization in accordance with embodiments of this disclosure.

FIG. 2 is a workflow of one or more embodiments of the present techniques. The workflow 200 involves inputting (block 202) images and dips to compute (block 204) the TST index and lamination channels. The input images may include dynamic images and/or measurement images. Dynamic images may be a contrast enhanced image and may be used for the detection of the lamination and may have a sufficient contrast for being able to accurately identify the boundaries. Measurement images may be calibrated and may be used for the characterization of the laminations, including lamination values and lamination contrast.

Figure 3:
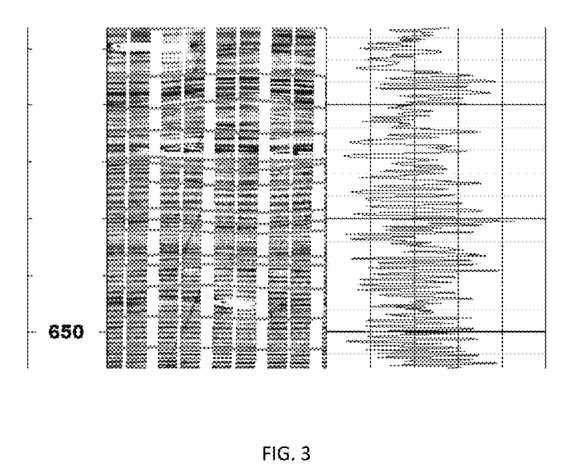
FIG. 3 is a dynamic image value graph in accordance with embodiments of this disclosure.

Computing (block 204) the TST index and lamination channels may result in outputting the dynamic image value channel, dynamic normalized image value channel, the measurement image value channel, and the True Statigraphic Thickness ("TST") index. The dynamic image value channel may be output following the orientation trend provided by the input dips and computing a median value on each depth level of the dynamic image. The median level may not be affected by small scale geological features crossing the laminations, including fractures, induced fractures, and heterogeneities such as vugs, concretions, etc., compared to the average. The dynamic image value channel 300 is represented in FIG. 3.

Referring back to the workflow 200, and the computing (block 204) of the TST index and lamination channels, the dynamic normalized image value channel may be output after normalizing the dynamic image value channel, e.g., to a value between −1 and 1, and may be used for the extraction of lamination boundaries. The measurement image value channel may be output following the orientation trend given by the input dips and computing a median value on each depth level of the measurement image. The measurement image value channel may be used for the estimation of lamination value and contrast.

Figure 4:
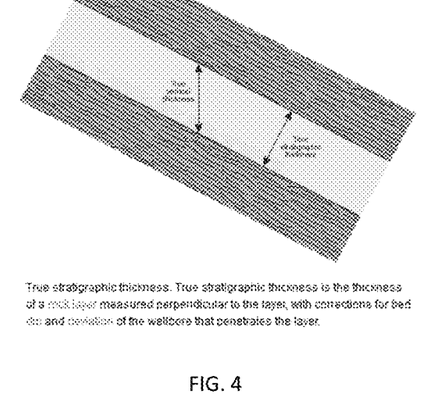
FIG. 4 is a true stratigraphic thickness representation in accordance with embodiments of this disclosure.

The TST index may then be used for correcting the lamination thickness and the lamination density from borehole deviation. The channels may then be used for lamination sequence analysis and recognition, regardless of the well trajectory. FIG. 4 represents a TST 400, where the TST is the thickness of a rock layer measured perpendicular to the layer, with corrections for bad dip and deviation of the wellbore that penetrates the layer.

Referring back to FIG. 2, in some embodiments, the workflow 200 also involves inputting (block 206) thickness minimum and maximum parameters to compute (block 208) the decomposition channel using DFT.

In some embodiments, the workflow 200 involves inputting (block 210) the contrast threshold to extract (block 212) boundaries. The detection of the boundaries may be performed on the dynamic image value channel. In some embodiments, the detection is based on the contrast, where a boundary is detected and then defined when the dynamic normalized value channel makes a jump with a minimum contrast defined by a parameter (e.g., a contrast threshold).

The present techniques may be extended to manage environments with multi-scale laminations, including laminations with different thickness scales. The Discrete Fourier Transform ("DFT") allows transforming the dip picking image value channel, which is a function of the depth (e.g., the depth in TST) into a spectrum channel, such as a channel expressing the weight of each lamination frequency contained in the initial signal. The inverse Fourier Transform enables the reconstruction of the initial signal from the spectrum channel. In the present techniques, the user may choose to focus on a particular thickness range. The algorithm applies the DFT for having the spectrum channel. The thickness range is converted to the frequency range, and this frequency range is kept in the spectrum. The signal may then be reconstructed from the filtered signal, and the final signal may be referred to as the dynamic decomposition value.

Figure 5:
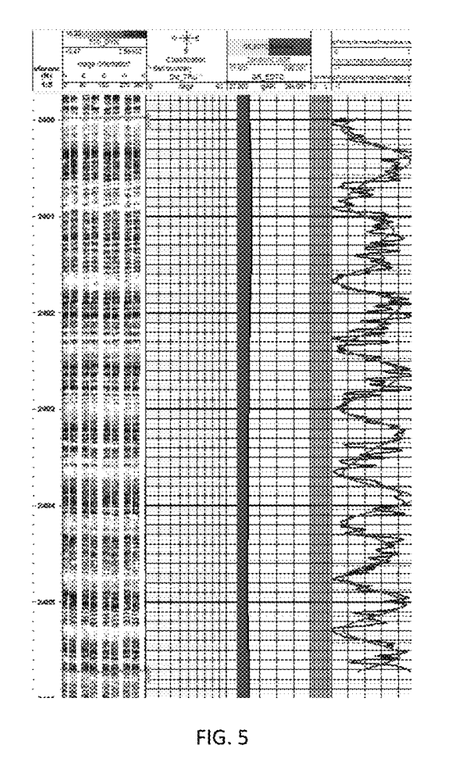
FIG. 5 is a decomposition channel graph in accordance with embodiments of this disclosure.
Figure 6:
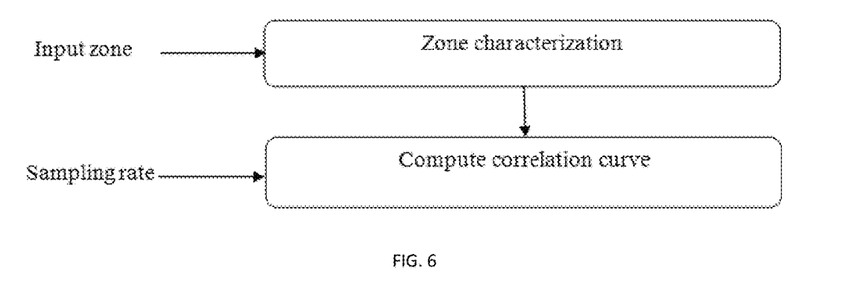
FIG. 6 is a workflow for lamination sequence characterization in accordance with embodiments of this disclosure.

As illustrated in FIG. 5, a dip picking image value channel 502 is shown, where the focus is on lamination having a thickness higher than 5 cm. The resulting dip picking decomposition value 504 is also shown, which follows the trends of the low frequency scale laminations. A scale classification is represented in FIG. 6, which may be provided by an expert and used to compute a decomposition curve for each class, thus providing a natural and expert-oriented multiscale analysis.

Referring back to the workflow 200 of FIG. 2, once the lamination boundaries have been detected, the workflow 200 involves computing (block 216) the lamination properties and statistics based on a sampling rate and window height (block 214). In some embodiments, the image value of each lamination is computed by taking the median value over the lamination and stored in the lamination value channel (step function channel). The image value contrast of each lamination is computed by taking the average contrast between the lamination and the surrounded laminations and stored in the lamination contrast channel (step function channel). The thickness of each lamination is computed in measured depth and stored in the lamination thickness (step function channel). The thickness of each lamination is computed in TST depth and stored in the lamination thickness corrected (step function channel). The density is computed by taking the number of lamination per unit measured depth: this channel depends on the sampling rate and the window height. The corrected density is computed by taking the number of lamination per unit TST depth: this channel depends on the sampling rate and the window height. In some embodiments, for multi-scale environments, the channels may be provided for each class.

In some embodiments, in case of very thin laminations, a different inversion models may be used. Very thin laminations may suffer from shoulder bed effects and their properties may biased depending on the type of imaging tool utilized. It may be possible to use a more advanced inversion model for determining the actual thickness and properties of the thin laminations. In the case of electrical borehole imagers, the user may use a model based approach based on the excess measured current for thin conductive beds. The bed thickness can then be more accurately estimated using a technique similar to that used for fracture aperture calculations.

Accordingly using the workflow 200 of FIG. 2, the laminations may be classified according to their lamination properties, including conductive and resistive laminations, thick and thin laminations, and low contrast and high contrast laminations.

Furthermore, in some embodiments, a lamination sequence characterization may be performed, as represented in the workflow 600 of FIG. 6. The lamination sequence characterization 600 may involve zone characterization (block 604) using the zone as an input (block 602) and a sampling rate may be used (block 606) to compute (block 608) the correlation curve.

Properties may be computed for each lamination. In lamination characterization (e.g., workflow 200), the value, the contrast, the thickness may be classified. In accordance with the present techniques, as well as for the lamination sequence characterization of workflow 600, additional properties could be also used for refining the characterization such as thickness derivative, texture information, geometry, etc. When selecting a zone of interest, the laminations may be indicated, and lamination properties may be computed and stored. A clustering algorithm is then performed for gathering the laminations having similar properties, where the number of clusters may depend on the number of lamination within the zone. Each lamination is then assigned to one cluster (e.g., the closest cluster), so that, by assigning all the laminations within the zone, a histogram may be generated which reveals the number of laminations attached to each cluster. This reference histogram characterizes the user-picked lamination zone.

For each scanned depth level, depending on the sampling rate, a zone with the same extent as the user-picked zone is defined. Using the reference clusters characterized from the user-picked zone, each lamination may be assigned to the closest cluster, thus building a histogram characterizing the zone. The distance between the reference histogram and this histogram is computed (e.g., chi square distance), normalized and converted into correlation. Finally, the correlation could be display and the user can quickly identify the zone similar to the picked one. This algorithm could be extended to multiple classes, where multiple zones may be selected and a class may be assigned to each of this zone. The algorithm will compute a correlation curve for each picked zone. In a second step, at each scanned level, a class corresponding to the maximum correlation may also be assigned.

In general, full borehole images may be created by azimuthally combining images for each of the pads of the tool. The pads may be vertically offset, and the images for different depths may be vertically shifted to become in-depth. Due to the depth inaccuracies, putting images in depth may be difficult. As such, decreasing the amount of runs, such as by using a swivel control device, may result in a more accurate borehole image.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
computing a true stratigraphic thickness ("TST") index based on one or more dynamic images, one or more measurement images, or combinations thereof, wherein computing the TST index comprises outputting:
a dynamic image value channel comprising a median value on each depth of the one or more dynamic images;
a dynamic normalized image value channel comprising a normalization of the dynamic image value channel;
a measurement image value channel comprising a median value on each depth of the measurement image; and
the TST index;
computing a decomposition channel based on the TST;
extracting lamination boundaries from the dynamic image value channel based on the decomposition channel; and
computing the lamination properties based on the lamination boundaries.

2. The method of claim 1, wherein computing the decomposition channel comprises using a Discrete Fourier Transform ("DFT") to transform a dip picking image value channel into a spectrum channel.

3. The method of claim 1, comprising inputting a contrast threshold, and extracting the lamination boundaries from the dynamic image value channel based on the contrast channel.

4. The method of claim 1, wherein computing the lamination properties comprises classifying lamination according to conductive laminations or resistive laminations.

5. The method of claim 1, wherein computing the lamination properties comprises classifying lamination according to thick laminations or thin laminations.

6. The method of claim 1, wherein computing the lamination properties comprises classifying lamination according to high contrast laminations or low contrast laminations.

7. A system comprising:
a downhole imaging tool configured to output formation properties; and
an image processing system comprising a processor suitable for executing machine readable instructions to characterize a lamination zone and to compute a correlation curve based on the characterization, wherein the processor is suitable for executing machine readable instructions to compute a true stratigraphic thickness ("TST") index based on one or more dynamic images, one or more measurement images, or combinations thereof,
wherein the compute of TST index comprises outputting:
a dynamic image value channel comprising a median value on each depth of the one or more dynamic images;
a dynamic normalized image value channel comprising a normalization of the dynamic image value channel;
a measurement image value channel comprising a median value on each depth of the measurement image; and the TST index;
computing a decomposition channel based on the TST;
extracting lamination boundaries from the dynamic image value channel based on the decomposition channel; and
computing the lamination properties based on the lamination boundaries.

8. The system of claim 7, wherein the processor is suitable for executing machine readable instructions to further:
compute a decomposition channel based on the TST;
extract lamination boundaries from the dynamic image value channel based on the decomposition channel; and
compute the lamination properties based on the lamination boundaries.

9. The system of claim 8, wherein the compute decomposition channel comprises using a Discrete Fourier Transform ("DFT") to transform a dip picking image value channel into a spectrum channel.

10. The system of claim 8, wherein the processor is suitable for executing machine readable instructions to further: receive input of a contrast threshold, and extract the lamination boundaries from the dynamic image value channel based on the contrast channel.

11. The system of claim 8, wherein the compute lamination properties comprises classifying lamination according to conductive laminations or resistive laminations.

12. The system of claim 8, wherein the compute lamination properties comprises classifying lamination according to thick laminations or thin laminations.

13. The system of claim 8, wherein the compute lamination properties comprises classifying lamination according to high contrast laminations or low contrast laminations.

14. A system comprising a processor configured to:
computing a true stratigraphic thickness ("TST") index based on one or more dynamic images, one or more measurement images, or combinations thereof, wherein computing the TST index comprises outputting:
 a dynamic image value channel comprising a median value on each depth of the one or more dynamic images;
 a dynamic normalized image value channel comprising a normalization of the dynamic image value channel;
 a measurement image value channel comprising a median value on each depth of the measurement image; and
 the TST index;
computing a decomposition channel based on the TST;
extracting lamination boundaries from the dynamic image value channel based on the decomposition channel; and
computing the lamination properties based on the lamination boundaries.

15. The system of claim 14, wherein computing the decomposition channel comprises using a Discrete Fourier Transform ("DFT") to transform a dip picking image value channel into a spectrum channel.

16. The system of claim 14, comprising inputting a contrast threshold, and extracting the lamination boundaries from the dynamic image value channel based on the contrast channel.

17. The system of claim 14, wherein computing the lamination properties comprises one or more of: (1) classifying lamination according to conductive laminations or resistive laminations, (2) classifying lamination according to thick laminations or thin laminations, or (3) classifying lamination according to high contrast laminations or low contrast laminations.

18. The system of claim 14, further comprising a downhole imaging tool configured to output formation properties, wherein the one or more dynamic images, one or more measurement images, or combinations thereof, are obtained by the downhole tool.

* * * * *